H. T. ROBERG.
SEPARATOR FOR STORAGE BATTERIES.
APPLICATION FILED JULY 30, 1920.

1,358,576.

Patented Nov. 9, 1920.

WITNESSES
Edw. Thorpe
Franklin J. Foster

INVENTOR
HARRY T. ROBERG
BY
ATTORNEYS

UNITED STATES PATENT OFFICE.

HARRY THEODORE ROBERG, OF CASTANA, IOWA.

SEPARATOR FOR STORAGE BATTERIES.

1,358,576.   Specification of Letters Patent.   Patented Nov. 9, 1920.

Application filed July 30, 1920. Serial No. 400,173.

*To all whom it may concern:*

Be it known that I, HARRY T. ROBERG, a citizen of the United States, and a resident of Castana, in the county of Monona and State of Iowa, have invented a new and Improved Separator for Storage Batteries, of which the following is a full, clear, and exact description.

This invention relates to improvements in separators for storage batteries, an object of the invention being to provide a separator which is of rubber composition and which will be a perfect insulator.

It is customary in the art to use wood generally treated in some way for the purpose, but I provide a separator of rubber which will outlast any ordinary separator and at the same time be comparatively cheap to manufacture.

The object of using this material in the separator is to permit a battery to discharge at an unusually high rate and to cause a battery to quickly take the charge when in discharged condition.

With these and other objects in view the invention consists in certain novel features of construction, and combinations and arrangements of parts as will be more fully hereinafter described and pointed out in the claims.

In the accompanying drawings—

Figure 1:
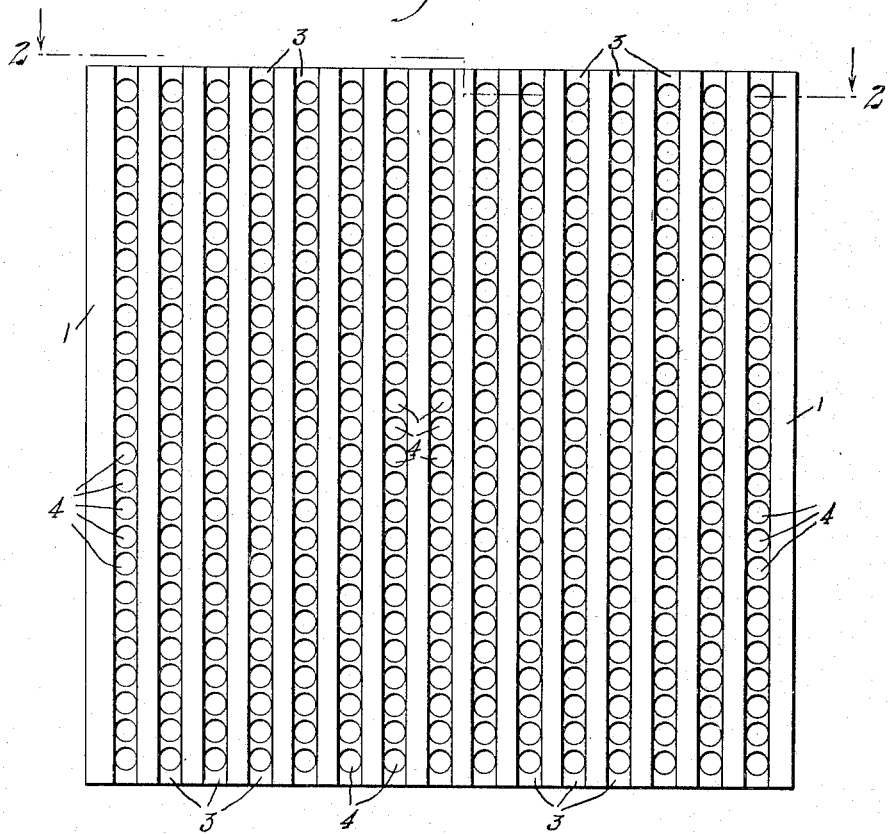
Figure 1 is a view in side elevation of my improved separator.
Figure 2:
Fig. 2 is a view partly in elevation and partly in transverse section on the staggered line 2—2 of Fig. 1.

Referring in detail to the drawings, 1 represents my improved separator. The separator is of rubber composition and is preferably, but not necessarily, of the same composition as the battery jar, not shown. The separator is in the form of a thin rectangular plate having a flat face 2 and a series of longitudinal sediment grooves 3 in its other face.

The base walls of the grooves are provided with series of perforations 4, the diameter of the perforations equaling the width of the grooves. The perforations are ultimately close together and extend from end-to-end of all of the grooves.

The separators are, of course, intended for use between the battery plates of a storage battery. The great number and the arrangement of the perforations permit a free electrolysis through the separator and, consequently, allows a battery to discharge at a high rate. For the same reason batteries using my improved separator will take a charge more quickly than with the usual type of wooden separators.

I do not wish to be limited to the use of any particular rubber composition, but rather wish to cover broadly the idea of a separator made of any rubber composition and embodying the novel features of construction pointed out.

It will be obvious that various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. As a new article of manufacture, a separator for storage batteries composed of rubber composition and comprising a plate having a flat face and having a series of longitudinal grooves in its other face, the base walls of said grooves having series of perforations therein, said perforations being relatively close together and extending from end-to-end of the grooves and the diameter of the perforations equaling the width of the grooves.

2. A separator, comprising a plate having one flat face, and having a series of longitudinal grooves in its other face, the width of said grooves being equal to the distance between said grooves, and the base walls of each of said grooves provided with a row of perforations throughout its length.

HARRY THEODORE ROBERG.